United States Patent
Genma

(10) Patent No.: US 9,964,931 B2
(45) Date of Patent: May 8, 2018

(54) NUMERICAL CONTROLLER WITH MACHINING CONDITION ADJUSTMENT FUNCTION WHICH REDUCES CHATTER OR TOOL WEAR/BREAKAGE OCCURRENCE

(71) Applicant: FANUC CORPORATION, Minamitsuru-gun, Yamanashi (JP)

(72) Inventor: Eiji Genma, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 39 days.

(21) Appl. No.: 15/230,895

(22) Filed: Aug. 8, 2016

(65) Prior Publication Data
US 2017/0060104 A1    Mar. 2, 2017

(30) Foreign Application Priority Data
Aug. 27, 2015 (JP) .................... 2015-167634

(51) Int. Cl.
G06F 19/00     (2018.01)
G05B 13/02     (2006.01)
G05B 19/042    (2006.01)

(52) U.S. Cl.
CPC ..... *G05B 13/0265* (2013.01); *G05B 19/0426* (2013.01); *G05B 2219/33056* (2013.01)

(58) Field of Classification Search
CPC .................................................. G05B 19/406
USPC ........................................................ 700/174
See application file for complete search history.

(56) References Cited

U.S. PATENT DOCUMENTS

| 5,829,932 | A  | * | 11/1998 | Kis ......................... | B23Q 1/26 408/13 |
| 6,516,237 | B1 | * | 2/2003 | Aoki ...................... | G05B 17/02 700/109 |
| 8,729,420 | B2 | * | 5/2014 | Kudou ................... | B23H 1/024 219/69.13 |
| 9,501,053 | B2 | * | 11/2016 | Lee ....................... | G05B 19/404 |
| 9,511,464 | B2 | * | 12/2016 | Ebihara .............. | B23Q 11/0035 |
| 2003/0083772 | A1 | | 5/2003 | Shiba | |

(Continued)

FOREIGN PATENT DOCUMENTS

JP    H04135209         5/1992
JP    H 04311206 A     11/1992
(Continued)

OTHER PUBLICATIONS

Japanese Office Action dated Jul. 27, 2016 for Japanese Application No. 2015-167634, including English translation, 5 pages.

*Primary Examiner* — Suresh Suryawanshi
(74) *Attorney, Agent, or Firm* — Ratner Prestia

(57) ABSTRACT

A numerical controller includes a machine learning device for performing machine learning of machining condition adjustment of a machine tool. The machine learning device calculates a reward based on acquired machining-state data on a workpiece, and determines an adjustment amount of machining condition based on a result of machine learning and machining-state data, and adjusts machining conditions based on the adjustment amount. Further, the machine learning of machining condition adjustment is performed based on the determined adjustment amount of machining condition, the machining-state data, and the reward.

8 Claims, 4 Drawing Sheets

(56) References Cited

U.S. PATENT DOCUMENTS

| | | | | |
|---|---|---|---|---|
| 2005/0248304 A1* | 11/2005 | Endou | ............... | G05B 19/186 318/575 |
| 2007/0051701 A1* | 3/2007 | Ogata | ............... | B23H 7/20 219/69.17 |
| 2013/0245807 A1* | 9/2013 | Herbst | ............... | G05B 13/024 700/117 |
| 2013/0338814 A1* | 12/2013 | Uchida | ............... | G05B 19/18 700/180 |

FOREIGN PATENT DOCUMENTS

| | | |
|---|---|---|
| JP | H05104395 | 4/1993 |
| JP | H08297507 | 11/1996 |
| JP | H1034496 | 2/1998 |
| JP | H1086039 | 4/1998 |
| JP | 2003140715 | 5/2003 |

* cited by examiner

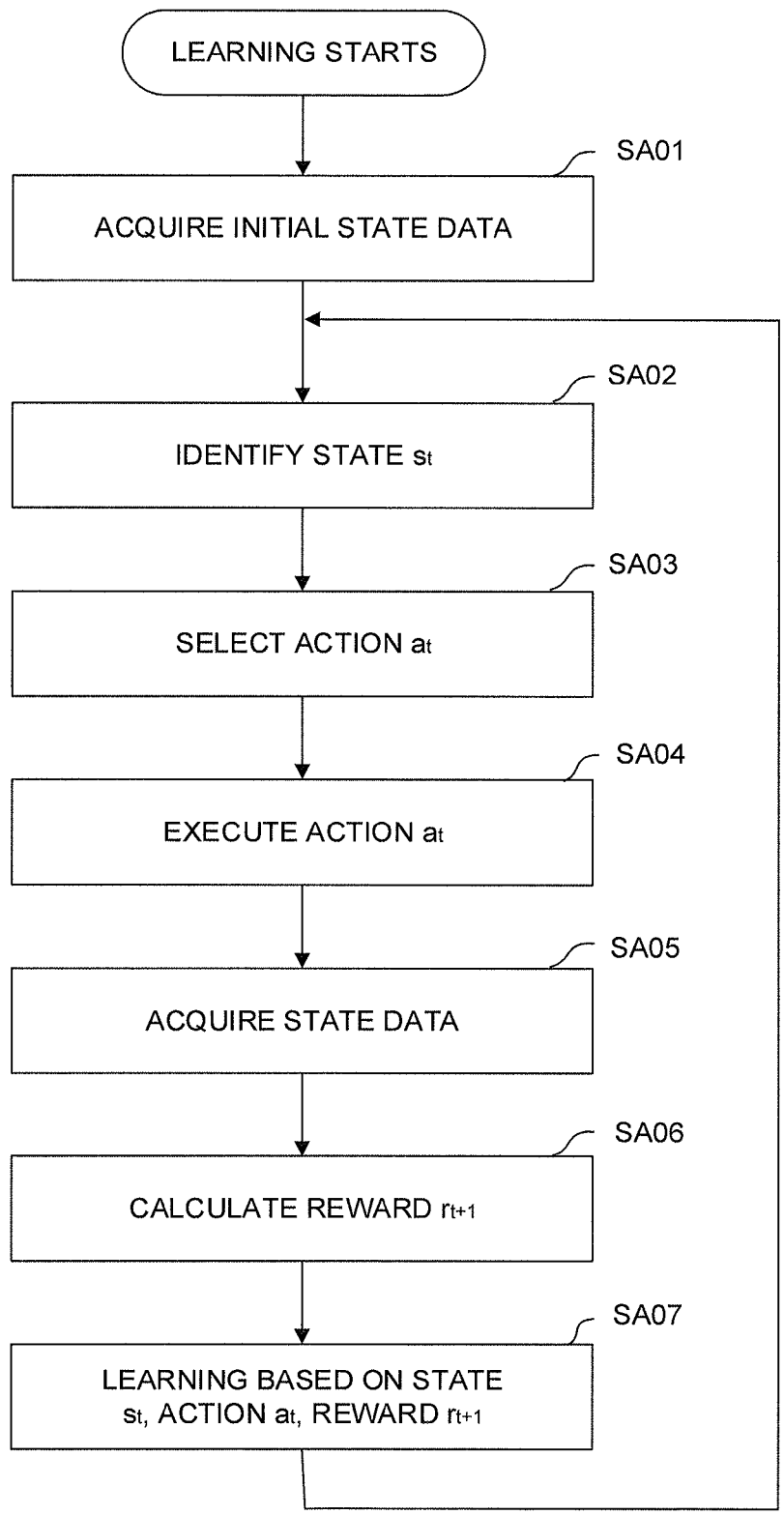

NUMERICAL CONTROLLER WITH MACHINING CONDITION ADJUSTMENT FUNCTION WHICH REDUCES CHATTER OR TOOL WEAR/BREAKAGE OCCURRENCE

BACKGROUND OF THE INVENTION

1. Field of the Invention

The present invention relates to a numerical controller, and particularly to a numerical controller with a machining condition adjustment function which reduces chatter or tool wear/breakage occurrence.

2. Description of the Related Art

In the case where machining is performed by a machine tool using a tool, a controller for controlling the machine tool issues commands to specify path, speed, and spindle revolution number specified as program commands. At this time, depending on commands, chatter or tool wear/tool breakage may occur during machining to adversely affect a machined surface. In the case where chatter or tool wear/tool breakage occurs during machining, an operator adjusts spindle revolution number and feed rate to find machining conditions under which chatter or tool wear/tool breakage does not occur.

Japanese Patent Application Laid-Open No. 04-311206 discloses a malfunction avoidance control method in which monitoring is performed using sensor data during machining, a cause is specified when a malfunction such as machine vibration or tool breakage occurs, machining is performed under machining conditions different from usual machining conditions within a range set in advance, and a machining program is revised based on the specified cause so as to obtain machining conditions under which a malfunction does not occur.

However, to select optimal machining conditions under which chatter or tool wear/tool breakage does not occur, much experience is required. Thus, there is a problem that it takes a long time to adjust machining conditions, depending on abilities of an operator. Moreover, there are machining situations in which it is very difficult to select machining conditions under which chatter or tool wear/tool breakage does not occur. In such a case, an operator may not be able to find appropriate machining conditions by trial and error.

For this problem, the aforementioned Japanese Patent Application Laid-Open No. 04-311206 describes that machining conditions under which a malfunction does not occur are selected, but does not describe a specific technical method for adjusting machining conditions to achieve that.

SUMMARY OF THE INVENTION

Accordingly, an object of the present invention is to provide a numerical controller with a machining condition adjustment function which reduces chatter or tool wear/tool breakage.

A numerical controller according to the present invention controls at least one of a spindle revolution number and a feed rate of a machine tool and a position of a tool with respect to a workpiece in accordance with a program command to machine the workpiece. The numerical controller includes a machine learning device that performs machine learning of a parameter of a machining condition to be adjusted in the machining and an adjustment amount of the parameter to be adjusted. The machine learning device includes a state observation unit that acquires, as state data, information indicating a machining state in the machining; a reward condition storage unit that stores reward conditions; a reward calculation unit that calculates a reward based on the state data and the reward conditions; a machining condition adjustment learning unit that performs machine learning of adjustment of machining condition; and a machining condition adjustment unit that determines, as an adjustment action, a parameter of a machining condition to be adjusted and an adjustment amount of the parameter, based on a result of the machine learning of adjustment of machining condition by the machining condition adjustment learning unit and the state data, and adjusts the machining condition in the machining based on the adjustment action. The machining condition adjustment learning unit is configured to perform machine learning of the adjustment of machining condition based on the adjustment action, the state data acquired by the state observation unit after machining operation based on the adjusted machining conditions outputted, and the reward calculated by the reward calculation unit.

The state data may include at least one of a spindle revolution number, a feed rate, a cut amount, chatter as machine vibration, chattering sound, a tool wear/breakage state, and a machined-surface state during machining.

The parameter of machining condition to be adjusted may include at least one of a spindle revolution number and a feed rate.

The numerical controller may further include a learning result storage unit that stores a result of learning by the machining condition adjustment learning unit, wherein the machining condition adjustment unit is configured to adjust machining conditions based on a learning result of adjustment of machining condition which is learned by the machining condition adjustment learning unit and a learning result of adjustment of machining condition which is stored in the learning result storage unit.

In the reward conditions, a positive reward may be given when the tool travels along a tool path at a high speed or when quality of machined-surface of a workpiece is better than a predetermined reference value, whereas a negative reward may be given when chatter as machine vibration or chattering sound occurs, when tool wear or tool breakage occurs, or when quality of machined-surface of a workpiece is worse than the predetermined reference value.

The numerical controller may be connected to at least one other numerical controller, and the numerical controller may exchange or share a result of machine learning with the other numerical controller.

The machine learning may be performed to maximize the reward using an evaluation function expressing the state data and machining condition adjustment as arguments.

A machine learning device according to the present invention is a machine learning device in which machine learning of adjustment of machining conditions during machining of a workpiece by a machine tool controlled by a numerical controller has been carried out. The machine learning device includes: a learning result storage unit that stores a result of the machine learning of adjustment of machining conditions; a state observation unit that acquires, as state data, information indicating a machining state in the machining; and a machining condition adjustment unit that determines, as an adjustment action, a parameter of a machining condition to be adjusted and an adjustment amount of the parameter, based on a result of the machine learning of adjustment of machining condition stored in the learning result storage unit and the state data, and adjusts the machining condition in the machining based on the adjustment action.

In the present invention, adjustment is performed by machine learning to achieve machining conditions under which chatter or tool wear/tool breakage does not occur. Thus, an adverse effect on a machined surface and the like can be prevented, and machining stability is improved.

BRIEF DESCRIPTION OF THE DRAWINGS

The forgoing and other objects and feature of the invention will be apparent from the following description of preferred embodiments of the invention with reference to the accompanying drawings, in which:

FIG. 4 is a flowchart for explaining the flow of machine learning performed by a machining condition adjustment learning unit of the numerical controller in FIG. 3.

DETAILED DESCRIPTION OF THE PREFERRED EMBODIMENT

Figure 1:
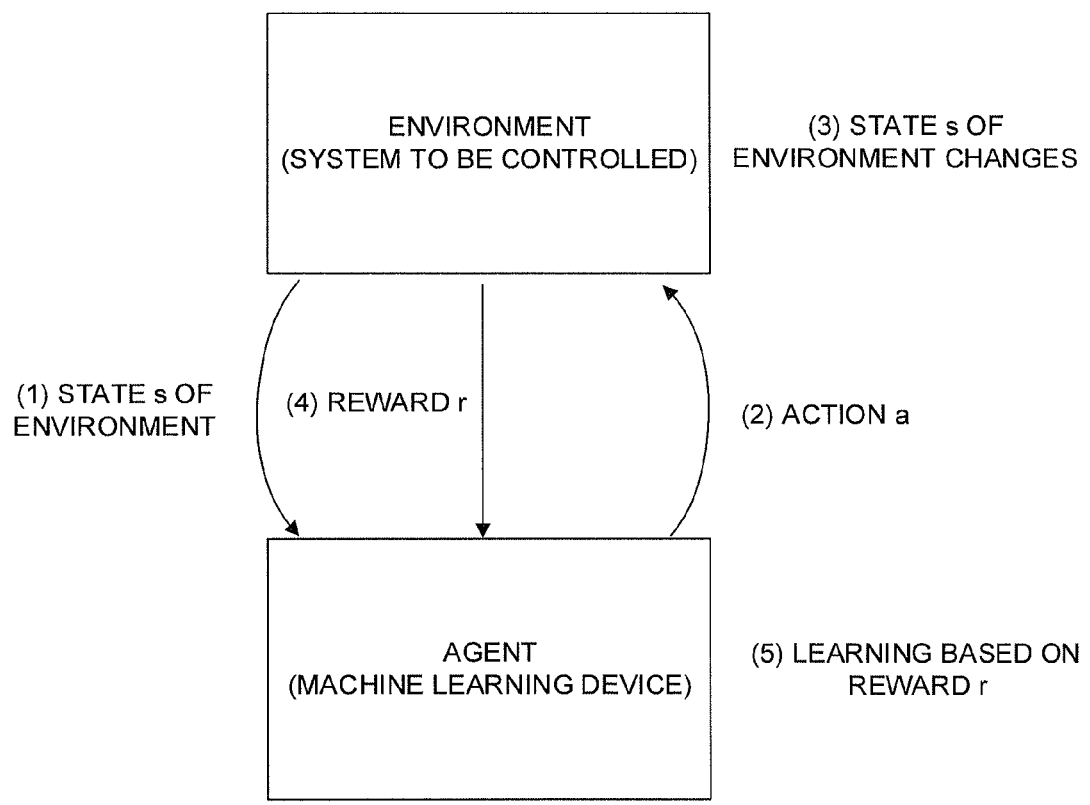
FIG. 1 is a view for explaining a basic concept of a reinforcement learning algorithm.

In the present invention, a machine learning device serving as an artificial intelligence is introduced into a numerical controller for controlling a machine tool for machining a workpiece. Thus, machine learning of machining condition adjustment with respect to machining-state data acquired from the machine tool, such as spindle revolution number, feed rate, cut amount, machine vibration (chatter), chattering sound, tool wear/breakage state, and machined-surface state, is performed to optimally adjust machining conditions in accordance with machining state.

Hereinafter, machine learning introduced into a numerical controller according to the present invention will be briefly described.

1. Machine Learning

Generally, machine learning is categorized into various algorithms, such as supervised learning and unsupervised learning, in accordance with objects and conditions. The present invention is aimed at learning the adjustment of machining conditions in a numerical controller for controlling a machine tool for machining a workpiece, and employs a reinforcement learning algorithm in which a machine learning device is caused to automatically learn an action to reach a goal only by giving rewards, in consideration of the difficulty of explicitly indicating what action (machining condition adjustment) is proper for machining states acquired from the machine tool, such as spindle revolution number, feed rate, cut amount, machine vibration (chatter), chattering sound, tool wear/breakage state, and machined-surface state.

A basic concept of a reinforcement learning algorithm will be described with reference to FIG. 1.

In reinforcement learning, interaction between an agent (machine learning device) as a learning entity and an environment (system to be controlled) as a subject for control advances learning and action by the agent. More specifically, the following interaction takes place between the agent and the environment:

(1) the agent observes a state $s_t$ of the environment at a certain point of time, (2) based on a result of the observation and past learning, the agent selects an action $a_t$ which the agent can take, and executes the action $a_t$, (3) the state $s_t$ of the environment is changed to a next state $s_{t+1}$ by the execution of the action $a_t$, (4) based on the change of the state as a result of the action $a_t$, the agent receives a reward $r_{t+1}$, and (5) the agent advances learning based on the state $s_t$, the action $a_t$, the reward $r_{t+1}$, and past learning results.

In the learning in the above-described (5), the agent acquires a mapping among the observed state $s_t$, the action $a_t$, and the reward $r_{t+1}$ as information serving as criteria for judging the amount of rewards which the agent can gain in the future. For example, if m represents the number of possible states at each time and n represents the number of possible actions, an m×n two-dimensional array for storing the reward $r_{t+1}$ for the combination of the state $s_t$ and the action $a_t$ is obtained by repeating actions.

Then, a value function (evaluation function) is used which is a function indicating how good the current state or action is, based on the above-described acquired mapping. The value function (evaluation function) is updated while actions are being repeated. Thus, an optimal action for a state is learned.

A state-value function is a value function indicating how good a certain state $s_t$ is, and is expressed as a function having a state as an argument and updated based on a reward gained for an action in a certain state, the value of a future state to which the action will cause the certain state to transition, and the like during learning in which actions are repeated. An update rule for a state-value function is defined in accordance with a reinforcement learning algorithm. For example, in TD-learning, which is one of reinforcement learning algorithms, a state-value function is defined by the following expression (1). It should be noted that in expression (1), α is learning rate, and γ is discount factor. These are defined in the ranges $0<\alpha\leq 1$ and $0<\gamma\leq 1$.

$$V(s_t) \leftarrow V(s_t) + \alpha[r_{t+1} + \gamma V(s_{t+1}) - V(s_t)] \quad (1)$$

Moreover, an action-value function is a value function indicating how good an action $a_t$ is in a certain state $s_t$, and is expressed as a function having a state and an action as arguments and updated based on a reward gained for an action in a certain state, the value of the action in a future state to which the action will cause the certain state to transition, and the like during learning in which actions are repeated. An update rule of an action-value function is defined in accordance with a reinforcement learning algorithm. For example, in Q-learning, which is one of major reinforcement learning algorithms, an action-value function is defined by the following expression (2). It should be noted that in expression (2), α is learning rate, and γ is discount factor. These are defined in the ranges $0<\alpha\leq 1$ and $0<\gamma\leq 1$.

$$Q(S_t, a_t) \leftarrow Q(s_t, a_t) + \alpha\left(r_{t+1} + \gamma\max_a Q(s_{t+1}, a) - Q(s_t, a_t)\right) \quad (2)$$

It should be noted that methods for storing a value function (evaluation function) as a result of learning include, for example, a method using a supervised learner such as an SVM or a neural network with multiple outputs which takes the state $s_t$ and the action $a_t$ as inputs and outputs a value (evaluation) in the case where the state s takes a large number of states, other than a method using an approximate function and a method using an array.

In the selection of an action in the above-described (2), an action $a_t$ which will maximize future rewards ($r_{t+1}$ + $r_{t+2}$ + ... ) in the current state $s_t$ is selected using the value function (evaluation function) created based on past learning (in the case where a state-value function is used, an action which will cause a transition to a most valuable state is selected; and, in the case where an action-value function is used, a most valuable action in the state is selected). It should be noted that during learning by the agent, a random action may be selected with a certain probability in the selection of an action in (2) for the purpose of advancing learning (ε-greedy algorithm).

Thus, learning is advanced by repeating the above-described (1) to (5). Even in the case where the agent is placed in a new environment after learning is finished in a certain environment, learning can be advanced by performing additional learning so that the agent may adapt to the environment. Accordingly, when machine learning is applied to machining condition adjustment in a numerical controller for controlling a machine tool for machining a workpiece as in the present invention, even in the case where machine learning is applied to the control of a new machine tool, machining condition adjustment learning can be performed in a short time by adding learning in a new environment to past machining condition adjustment learning.

Moreover, in reinforcement learning, a system which is constructed by connecting a plurality of agents through a network or the like can be used. Information such as states s, actions a, and rewards r are shared among the agents and utilized in learning by the agents, and each agent performs distributed reinforcement learning in which learning is performed in consideration of environments of other agents. Thus, efficient learning can be performed. In the present invention, machining condition adjustment learning in a numerical controller for controlling a machine tool for machining a workpiece can be efficiently performed by performing distributed machine learning in a state where a plurality of agents (machine learning devices) which control a plurality of environments (numerical controllers) are connected through a network or the like.

It should be noted that though various techniques such as Q-learning, SARSA, TD-learning, and an AC algorithm are well known as reinforcement learning algorithms, a reinforcement learning algorithm which is applied to the present invention may be any of the algorithms. All the above-described techniques of reinforcement learning algorithms are well known, and will not be further described here.

Hereinafter, a numerical controller according to the present invention into which a machine learning device is introduced will be described based on a specific embodiment.

2. Embodiment

Figure 2:
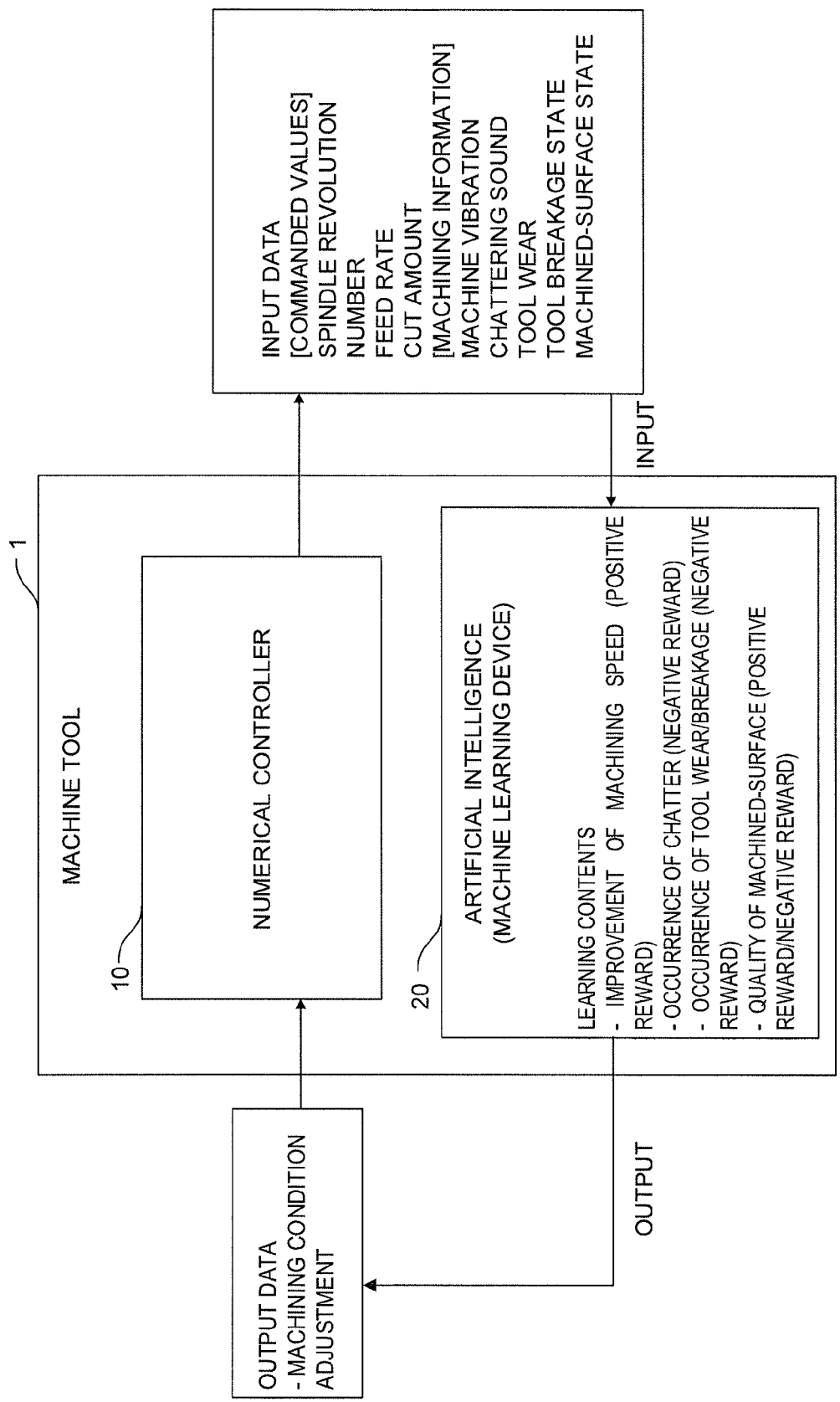
FIG. 2 is a conceptual diagram concerning machine learning by a numerical controller according to one embodiment of the present invention.

Machine learning of machining condition adjustment in a numerical controller according to one embodiment of the present invention into which a machine learning device is introduced will be described with reference to FIG. 2. It should be noted that FIG. 2 only shows components required for an explanation of machine learning in a numerical controller for controlling a machine tool according to the present embodiment.

In the present embodiment, a machine learning device 20 receives, as information to be used for specifying an environment (state $s_t$ described in "[1. Machine Learning]"), commanded values such as spindle revolution number, feed rate, and cut amount at the time of machining by a machine tool, and machining information such as machine vibration, chattering sound, tool wear/breakage state, and machined-surface state. These values are data acquired from various parts of a machine tool 1 and data acquired from a numerical controller 10.

In the present embodiment, the machine learning device 20 outputs (action $a_t$ described in "[1. Machine Learning]"), to the environment, data on adjustments of machining conditions such as spindle revolution number and feed rate at the time of machining by the machine tool.

Moreover, in the present embodiment, improvement of machining speed (positive reward), occurrence of chatter (negative reward), tool wear/breakage occurrence (negative reward), machined-surface quality (positive reward, negative reward), and the like are employed as rewards (reward $r_t$ described in "[1. Machine Learning]") to be given to the machine learning device 20. It should be noted that which of these data are employed in determining rewards may be appropriately set by an operator.

Further, in the present embodiment, the machine learning device 20 performs machine learning based on the above-described input data, output data, and rewards. In machine learning, a state $s_t$ is defined by a combination of pieces of input data at a certain time t. Machining condition adjustment performed for the defined state $s_t$ is an action $a_t$. A value obtained by evaluation calculation based on input data newly obtained as a result of machining condition adjustment caused by the action $a_t$ is a reward $r_{t+1}$. As described in "[1. Machine Learning]", the state $s_t$, the action $a_t$, and the reward $r_{t+1}$ are substituted into an update rule for a value function (evaluation function) according to a machine learning algorithm to advance learning.

Functions of the numerical controller 10 in FIG. 2 will be described below with reference to a functional block diagram in FIG. 3.

The numerical controller 10 for controlling the machine tool 1 analyzes a program 11 read from memory (not shown), and controls the machine tool 1 based on control data obtained as a result of the analysis, thus machining a workpiece. The machine tool 1 includes sensors (not shown) for detecting machine vibration (vibration sensor) which occurs during machining, chattering sound (sound sensor), tool wear/breakage state (image sensor), and machined-surface state (image sensor), respectively. The numerical controller 10 is configured to be capable of acquiring machining information indicating machining states through these sensors.

The numerical controller 10 includes a machining information acquisition unit 12 for acquiring data such as machining information from various parts of the machine tool 1, a machining condition change unit 13 for changing machining conditions by, for example, changing override values of spindle revolution number and feed rate, and a machine learning device 20 serving as an artificial intelligence for performing machine learning. It should be noted that the machine tool 1 and the numerical controller 10 include components of a general machine tool and a general numerical controller, and components except components particularly required for an explanation of machine learning operation in the present invention will not be described in detail.

Figure 3:
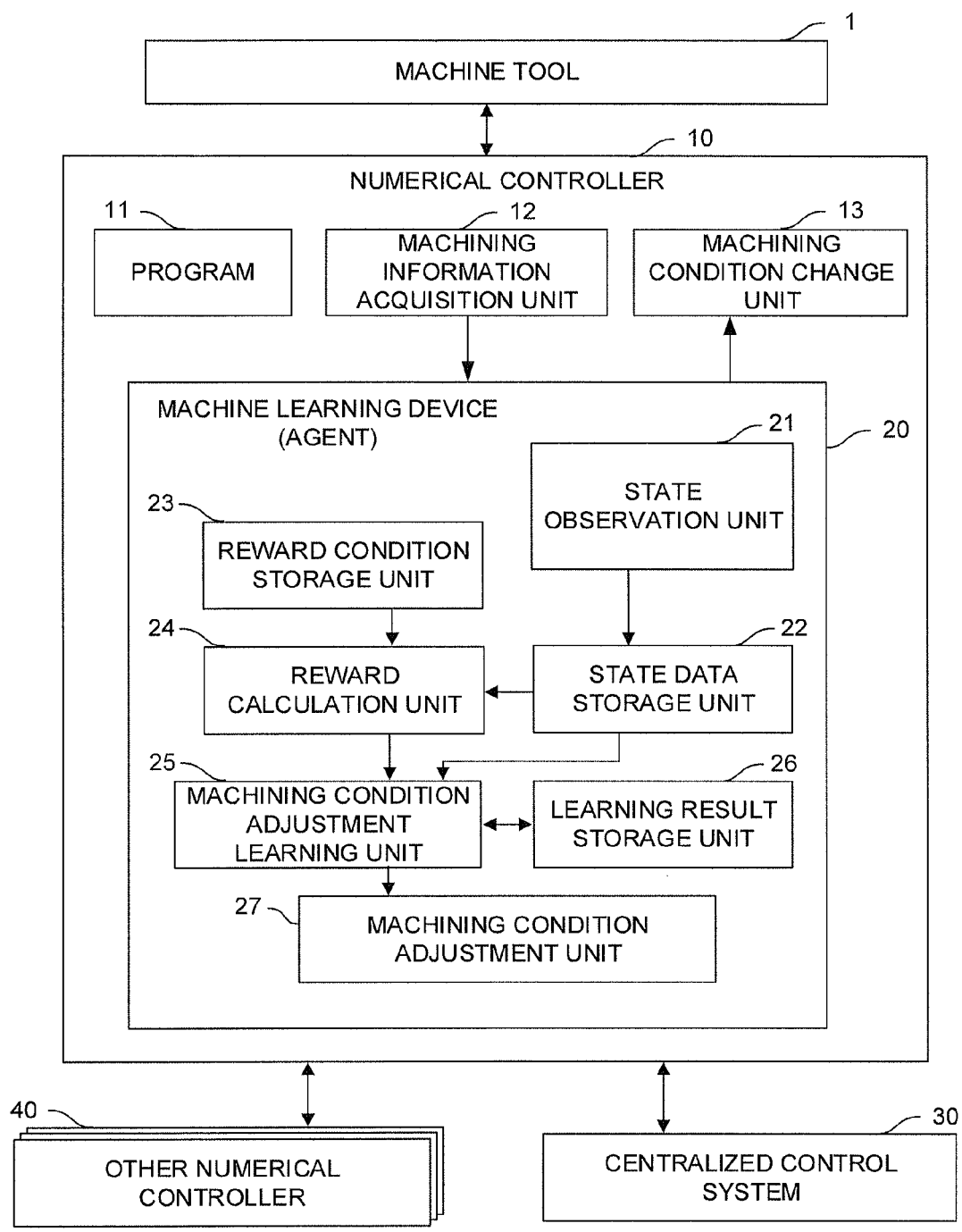
FIG. 3 is a block diagram showing functions of the numerical controller in FIG. 2.

When components of the numerical controller 10 shown in FIG. 3 are compared with elements in the reinforcement learning shown in FIG. 1, the machine learning device 20 in FIG. 3 corresponds to the agent in FIG. 1. Moreover, the machine tool 1 in FIG. 3, except for the machine learning device 20, and components of the numerical controller 10 correspond to the environment in FIG. 1.

The machine learning device 20 configured to perform machine learning includes a state observation unit 21, a state data storage unit 22, a reward condition storage unit 23, a reward calculation unit 24, a machining condition adjustment learning unit 25, a learning result storage unit 26, and a machining condition adjustment unit 27. The machine learning device 20 may be provided in the numerical controller 10 as shown in FIG. 3, or may be provided in a personal computer or the like outside the numerical controller 10.

The state observation unit 21 observes, as data related to machining state (hereinafter referred to as 'machining-state data'), commanded values such as spindle revolution number, feed rate, and cut amount acquired from control data obtained as a result of analysis of the program 11 of the numerical controller 10 and machining information on the machine tool 1 acquired by the machining information acquisition unit 12, and acquires the observed machining-state data in the machine learning device 20.

The state data storage unit 22 receives and stores the machining-state data, and outputs the stored machining-state data to the reward calculation unit 24 and the machining condition adjustment learning unit 25. The machining-state data inputted may be data acquired during latest machining operation or data acquired during past machining operation. Moreover, machining-state data stored on other numerical controller 40 or a centralized control system 30 can also be inputted to be stored and outputted.

The reward condition storage unit 23 stores conditions for giving rewards in machine learning which are set by an operator or the like. The rewards include positive rewards and negative rewards, and can be appropriately set. Input to the reward condition storage unit 23 may be from a personal computer, tablet terminal, or the like used in the centralized control system 30, but input through an MDI device (not shown) of the numerical controller 10 enables settings to be made more easily.

The reward calculation unit 24 analyzes the machining-state data inputted from the state observation unit 21 or the state data storage unit 22 based on conditions set in the reward condition storage unit 23, and outputs a calculated reward to the machining condition adjustment learning unit 25.

Examples of reward conditions set in the reward condition storage unit 23 according to the present embodiment will be described below.

[Reward 1: Improvement of Machining Speed (Positive Reward)]

If the machining speed of a workpiece is improved by previous machining condition adjustment (machining condition adjustment at time t−1), a positive reward is given according to the degree thereof.

[Reward 2: Occurrence of Chatter (Negative Reward)]

If machine vibration not less than a predetermined reference value set in advance or chattering sound not less than a predetermined reference value set in advance occurs during the machining of a workpiece in the machine tool 1, a negative reward is given according to the degree thereof. It is recommended that each predetermined reference value is set in the reward condition storage unit 23 in advance.

[Reward 3: Occurrence of Tool Wear/Breakage (Negative Reward)]

If tool wear reaches or exceeds a predetermined reference value set in advance during the machining of a workpiece in the machine tool 1, a negative reward is given according to the degree thereof. Moreover, if tool breakage occurs, a negative reward is given. It is recommended that each predetermined reference value is set in the reward condition storage unit 23 in advance.

[Reward 4: Quality of Machined-Surface (Positive Reward, Negative Reward)]

If the quality of machined-surface of a workpiece machined by the machine tool 1 after previous machining condition adjustment (machining condition adjustment at time t−1) is better than a predetermined reference value set in advance, a positive reward is given according to the degree thereof. In contrast, if the quality of machined-surface of the workpiece is worse than the predetermined reference value, a negative reward is given according to the degree thereof. The quality may be evaluated by, for example, setting as a reference an ideal machined surface assumed according to the program 11 and determining how far a machined surface after machining deviates from the reference (machining accuracy).

The machining condition adjustment learning unit 25 performs machine learning (reinforcement learning) based on machining-state data including input data and the like, a result of machining condition adjustment performed by the machining condition adjustment learning unit 25 itself, and a reward calculated by the reward calculation unit 24.

In machine learning performed by the machining condition adjustment learning unit 25, a state $s_t$ is defined by a combination of pieces of machining-state data at a certain time t, and an action $a_t$ is to determine an adjustment amount of machining condition in accordance with the defined state $s_t$. Further, machining conditions are adjusted by the machining condition adjustment unit 27 described later, and a result of the adjustment is outputted to the machining condition change unit 13. Then, the machine tool 1 is controlled based on machining conditions adjusted in this way to perform the machining of a workpiece. A value calculated by the reward calculation unit 24 based on data obtained as a result of the machining is a reward $r_{t+1}$.

A value function used in learning is determined in accordance with an applied learning algorithm. For example, in the case where Q-learning is used, learning may be advanced by updating an action-value function $Q(s_t, a_t)$ in accordance with the above-described expression (2).

The flow of machine learning performed by the machining condition adjustment learning unit 25 will be described with reference to a flowchart in FIG. 4. The processing is explained below according to respective steps.

[Step SA01] When machine learning is started, the state observation unit 21 acquires machining-state data on the machine tool 1.

[Step SA02] The machining condition adjustment learning unit 25 specifies the current state $s_t$ based on the machining-state data acquired by the state observation unit 21.

[Step SA03] The machining condition adjustment learning unit 25 selects an action $a_t$ (adjustment of machining condition) based on results of past learning and the state $s_t$ specified in step SA02.

[Step SA04] The action $a_t$ selected in step SA03 is executed.

[Step SA05] The state observation unit 21 acquires machining-state data indicating the state of the machine tool 1. At this stage, the state of the machine tool 1 has changed the action $a_t$ executed in step SA04 in association with temporal transition from time t to time t+1 and.

[Step SA06] The reward calculation unit 24 calculates a reward $r_{t+1}$ based on data on evaluation result acquired in step SA05.

[Step SA07] The machining condition adjustment learning unit 25 advances machine learning based on the state $s_t$ specified in step SA02, the action $a_t$ selected in step SA03, and the reward $r_{t+1}$ calculated in step SA06, and the process returns to step SA02.

Referring back to FIG. 3, the learning result storage unit 26 stores learning results by the machining condition adjustment learning unit 25. Moreover, the learning result storage unit 26 outputs the stored learning results to the machining condition adjustment learning unit 25 when the machining condition adjustment learning unit 25 reuses the learning results. To store learning results, a value function according to a machine learning algorithm to be used may be stored using an approximate function, an array, a supervised learner such as an SVM or a neural network with multiple outputs, or the like as described previously.

It should be noted that learning results stored on another numerical controller 40 or the centralized control system 30 can also be inputted to and stored on the learning result storage unit 26, and learning results stored on the learning result storage unit 26 can also be outputted to the other numerical controller 40 or the centralized control system 30.

The machining condition adjustment unit 27 determines an adjustment amount of machining condition based on results of learning by the machining condition adjustment learning unit 25 and data relating to the current machining state. The determination of adjustment amount of a machining condition here corresponds to an 'action a' used in machine learning. With regard to adjustment of machining condition, for example, a combination of each of parameter items constituting machining conditions and a change amount may be prepared as a selectable action (for example, action 1=spindle revolution number override+10%, action 2=feed rate override−10%, . . . ) to select an action which will maximize future rewards based on results of past learning. A selectable action may be an action to simultaneously adjust a plurality of machining condition items. Moreover, by employing the above-described ε-greedy algorithm, a random action may be selected with a predetermined probability to advance learning by the machining condition adjustment learning unit 25.

After that, the machining condition adjustment unit 27 sends a command to the machining condition change unit 13 based on the determined adjustment amount of machining condition to adjust machining conditions in the numerical controller 10. Further, the numerical controller 10 controls the machine tool 1 based on the machining conditions adjusted by the machining condition adjustment unit 27.

Thereafter, the machine learning device 20 acquires the current state of the machine tool 1 again, and repeats learning using inputted machining-state data. Thus, a better learning result can be obtained.

As a result of the learning the machine learning device 20 has performed in this way, learning by the machine learning device 20 is completed at a stage where an adjustment of machining condition according to a machining state is performed in the machining of a workpiece on the machine tool 1 by the numerical controller 10.

When machining is actually performed by a numerical controller for controlling a machine tool by using the above-described learning data in which learning has been completed, the numerical controller 10 may repeatedly operate the machine tool 1 using the learning data obtained when the learning is completed, not making the machine learning device 20 perform new learning.

Moreover, the machine learning device 20 in which learning has been completed (or the machine learning device 20 in which the learning result storage unit 26 stores completed learning data copied from other machine learning device 20) may be attached to the other numerical controller 40 such that the numerical controller 10 or 40 repeatedly operate the machine tool 1 using the learning data obtained when the learning is completed.

Further, the machine learning device 20 in which learning has been completed can be attached to another numerical controller 40 with the learning function thereof enabled. In that case, the machine learning device 20 can further learn individual differences between machine tools, aging, and the like when the machine tool 1 is controlled by these numeral controllers, thereby enabling to adjust and search for better machining conditions for respective machine tools.

The machine learning device 20 of the numerical controller 10 may singly perform machine learning. However, in the case where each of a plurality of numerical controllers 10 further includes means for communicating with the outside, machining-state data stored on the respective state data storage units 22 and learning results stored on the respective learning result storage units 26 can be sent and received to be shared. Thus, machine learning can be more efficiently performed. For example, when learning is performed while machining conditions are varied within a predetermined range, machining-state data and learning data can be sent between the respective numerical controllers 10 during machining in which different adjustment amounts are varied within a predetermined range in a plurality of numerical controllers 10, thus advancing learning in parallel. Thus, learning can be efficiently performed.

In the case where data are exchanged between a plurality of numerical controllers 10 as described above, communication may be performed through a host computer such as the centralized control system 30, or the numerical controllers 10 may communicate with each other directly or through a cloud. However, since there are cases where a large amount of data are dealt with, communication means having as fast a communication speed as possible is preferred.

While an embodiment of the present invention has been described above, the present invention is not limited only to the above-described examples of the embodiment, but can be carried out in various aspects by making appropriate modifications thereto.

The invention claimed is:

1. A numerical controller for controlling at least one of a spindle revolution number and a feed rate of a machine tool and a position of a tool with respect to a workpiece in accordance with a program command to machine the workpiece, the numerical controller comprising:
   a sensor configured to detect state data representative of a machining state; and
   a processor configured for machine learning of a parameter of a machining condition to be adjusted and an adjustment amount of the parameter to be adjusted, wherein the processor is configured as:
      a state observation unit that acquires, the state data from the sensor,
      a reward condition storage unit that stores reward conditions for at least one of tool chatter, tool wear or breakage, or quality of the machined workpiece, a reward calculation unit that calculates a positive reward or a negative reward based on the state data and the reward conditions, a machining condition adjustment learning unit that performs machine learning of adjustment of machining condition, and a machining condition adjustment unit that determines, as an adjustment action, a parameter of a machining condition to be adjusted and an adjustment amount of the parameter, based on a result of the machine learning of adjustment of machining condition by the machining condition adjustment learning unit and the state data, and adjusts the machining condition in the machining based on the adjustment action, wherein the machining condition adjustment learning unit is configured to perform machine learning of the adjustment of machining condition based on the adjustment action, the state data acquired by the state observation unit after machining operation based on the adjusted machining conditions outputted, and by maximizing future positive rewards calculated by the reward calculation unit.

2. The numerical controller according to claim 1, wherein the state data includes at least one of a spindle revolution number, a feed rate, a cut amount, chatter as machine vibration, chattering sound, a tool wear/breakage state, and a machined-surface state during machining.

3. The numerical controller according to claim 1, wherein the parameter of machining condition to be adjusted includes at least one of a spindle revolution number and a feed rate.

4. The numerical controller according to claim 1, further comprising:

a learning result storage unit that stores a result of learning by the machining condition adjustment learning unit, wherein the machining condition adjustment unit is configured to adjust machining conditions based on a learning result of adjustment of machining condition which is learned by the machining condition adjustment learning unit and a learning result of adjustment of machining condition which is stored in the learning result storage unit.

5. The numerical controller according to claim 1, wherein in the reward conditions, a positive reward is given when the tool travels along a tool path at a high speed or when quality of machined-surface of a workpiece is better than a predetermined reference value, and a negative reward is given when chatter as machine vibration or chattering sound occurs, when tool wear or tool breakage occurs, or when quality of machined-surface of a workpiece is worse than the predetermined reference value.

6. The numerical controller according to claim 1, wherein the numerical controller is connected to at least one other numerical controller, and the numerical controller exchanges or shares a result of machine learning with the other numerical controller.

7. The numerical controller according to claim 1, wherein the machine learning is performed to maximize the reward using an evaluation function expressing the state data and machining condition adjustment as arguments.

8. A machine learning device in which machine learning of adjustment of machining conditions during machining of a workpiece by a machine tool controlled by a numerical controller is carried out, the machine learning device comprising:

a sensor configured to detect state data representative of a machining state; and a processor configured as:

a state observation unit that acquires, the state data from the sensor, a reward condition storage unit that stores reward conditions for at least one of tool chatter, tool wear or breakage, or quality of the machined workpiece, a reward calculation unit that calculates a positive reward or a negative reward based on the state data and the reward conditions, a machining condition adjustment learning unit that performs machine learning of adjustment of machining condition, and a machining condition adjustment unit that determines, as an adjustment action, a parameter of a machining condition to be adjusted and an adjustment amount of the parameter, based on a result of the machine learning of adjustment of machining condition by the machining condition adjustment learning unit and the state data, and adjusts the machining condition in the machining based on the adjustment action, wherein the machining condition adjustment learning unit is configured to perform machine learning of the adjustment of machining condition based on the adjustment action, the state data acquired by the state observation unit after machining operation based on the adjusted machining conditions outputted, and by maximizing future positive rewards calculated by the reward calculation unit.

* * * * *